Patented Aug. 16, 1938

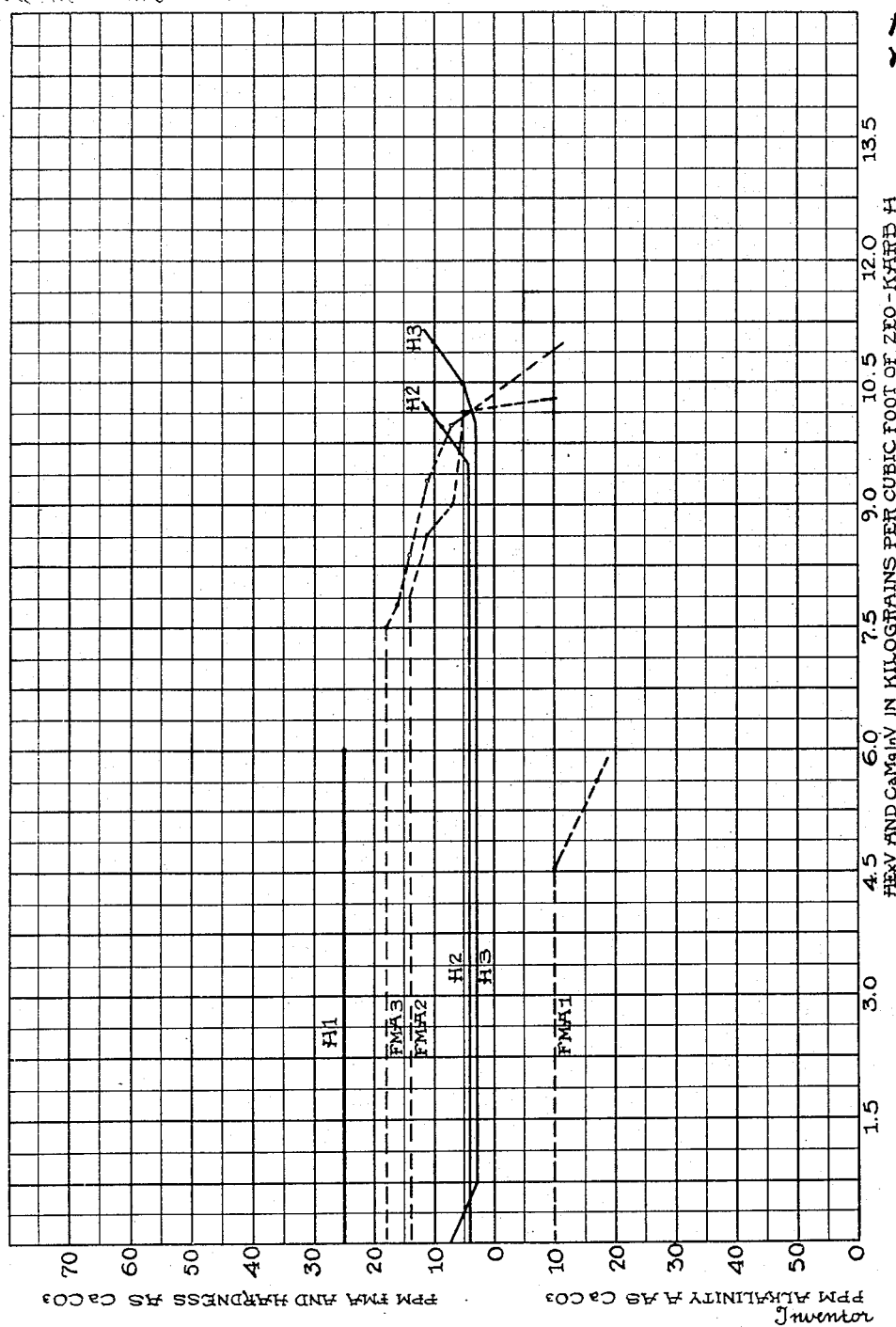

2,127,310

UNITED STATES PATENT OFFICE 2,127,310

HYDROGEN ZEOLITE WATER TREATMENT

Ray Riley, Long Island City, N. Y., assignor to The Permutit Company, New York, N. Y., a corporation of Delaware Application May 24, 1937, Serial No. 144,487

13 Claims. (Cl. 210—24)

This invention relates to hydrogen zeolite water treatment; and it comprises a process of treating water by removal of bases from contained saline solutes with the aid of hydrogen ion zeolite, advantageously carbonaceous in nature or of humic origin, wherein alternate flows of saline water and regenerating acid water are passed through a pervious bed of hydrogen ion exchanging zeolites, the quantity of acid in the regenerating flow being sufficient to regenerate the greater part but not all of the zeolite bed to the hydrogen ion condition and the flow of saline water being such as to produce a water of lessened saline content, non-acid or basic in nature; all as more fully hereinafter set forth and as claimed.

In the highly developed art of base exchange water softening, a comparatively recent advance is the use of hydrogen zeolites having the power of removing or abstracting bases from water carrying dissolved salines; hard waters containing calcium and magnesium, softened waters containing sodium salts, natural waters containing sodium compounds and other salines, etc. In so doing the bases are exchanged for the hydrogen ion of the zeolite leaving the water acid. Many such hydrogen ion exchange bodies or zeolites are known. Among them are the sulfated humic materials produced from lignite and other coals by sulfating treatments. These sulfated humic materials have operating exchange values greatly exceeding those of many ordinary siliceous zeolites, the exchange capacity of native humic materials such as lignite itself being greatly increased by the sulfating treatment.

The cation abstracting power of the hydrogen zeolites can be transformed into ordinary base exchange power by regeneration with a sodium salt, such as ordinary common salt brine; the new humic zeolites being thus converted into base exchange zeolites of high exchange capacity.

The humic zeolites possessing hydrogen ion exchange power, after exhaustion of this power, can be regenerated by treatment with an acid in extremely dilute aqueous solution although in concentration relatively greater than the acid concentration in the water produced from hard water by hydrogen ion exchange. When the replaceable hydrogen ions of the humic zeolite are more or less completely exchanged for the cations contained in hard water, regeneration or replacement of these cations in the zeolite by the hydrogen ions of acid water restores the power of the hydrogen zeolite to remove bases from water, whether these be hardness-giving bases (lime and magnesia, either or both) or alkali bases, such as soda. This cyclic process of bringing water containing dissolved salts into contact with a hydrogen zeolite, regenerating the zeolite by an acid treatment when its exchange capacity becomes impaired and using the regenerated zeolite for treating more water, may be continued substantially indefinitely. In practice, however, the process has the disadvantage that the water after treatment is acid; this acidity insofar as it is caused by carbon dioxide may be immaterial but there is often acidity due to the strong mineral acids, notably sulfuric and hydrochloric. Ordinary hard water usually contains dissolved sulfates and chlorides of the hardening elements as well as carbonates, and salts of the strong mineral acids are converted by the hydrogen zeolite into sulfuric and hydrochloric acids. Acidity due to carbonic acid can be readily obviated by boiling, aeration, etc., but the other acids cannot be so simply removed. The presence of such acids in water, even in concentrations of a few parts per million, may be highly objectionable, as for example when the water is fed to a boiler, and it is usually necessary to give the zeolite-treated water further treatments to remove the acidity.

For many purposes, as in municipal water softening, it is sometimes desirable to lessen the hardness to a predetermined degree without removing it altogether. In other cases, as with artificially softened water, and natural waters containing sodium bicarbonate it is sometimes desirable, similarly, to reduce the amount of salines without a complete removal. In all cases, however, it is desirable that the effluent water be left without acidity due to free mineral acids, acids other than $CO_2$.

I have discovered, and the present invention is based on the discovery, that I can attain these ends by subjecting hard and other saline waters to zeolite treatment as a unitary operation by the artifice of using part of the bed as a hydrogen zeolite and the rest as an ordinary zeolite. In an ordinary vertical granular bed this can be effected by using in the regenerating step an amount of acid insufficient to convert the whole bed into hydrogen zeolite. I may, for example, with a given bed use 50 per cent of the amount of acid usually required to regenerate the whole bed. In so doing, carbonate hardness is removed to any extent desired, sulfates and chlorides remain as neutral salts and enough bicarbonate can be passed through to impart methyl orange alkalinity to the effluent water. An alkalinity sufficient to give a methyl orange reaction is in general desirable in waters for miscellaneous purposes. In the operation of the present invention the alkalinity (methyl orange) of the effluent water remains fairly constant, while the amount of hardness may vary.

Assuming a vertical pervious bed of granular hydrogen zeolites, after a water-softening operation, the granules are all charged with lime or magnesia, either or both. If now an acid regenerating liquid containing acid in amount equal to half of the stored up bases in the bed is sent through the softener in downflow, the top layer is wholly regenerated and converted to hydrogen zeolite. Using $H_2SO_4$ as regenerating acid, the lime and magnesia are converted into corresponding sulfates and these pass in solution through the lime charged zeolites of the bottom layers without change. After rinsing, the bed can now be regarded, for the purposes of illustration, as two superimposed layers, the upper being hydrogen zeolites and the lower, zeolite containing base. On now passing hard water downward, the top layer abstracts bases leaving acids in solution. Free strong acids, like hydrochloric and sulfuric acid, are neutralized by the bases in the lower layer, the H ions of these acids displacing basic cations in the lower layer, while the $CO_2$ in the water has little effect on the bases in the zeolite. The net result is that the effluent water contains a little calcium bicarbonate, enough to give it a methyl orange alkalinity and there is no free sulfuric or hydrochloric acid. Sulfuric and hydrochloric acids are neutralized at the expense of lime, magnesia or soda.

There is of course in fact no sharp division of the zeolite into distinct zones as they merge gradually one into the other, but the action of the bed is more readily understood by regarding the bed as divided into definite zones by the regenerating acid treatment, the first zone being a bed of hydrogen zeolite and the second one of a basic zeolite, as for example a calcium zeolite. There is another zone, that of hardness charged zeolites as the flow continues. This third zone has, of course, no definite boundaries but the stream of water passing through the zeolite bed, after some time, first contacts with exhausted zeolite, then with hydrogen zeolite and finally the now acid water enters the zone of zeolite charged with exchangeable base, which may be the calcium, magnesium and sodium cations. These basic ions are exchanged for the hydrogen ions in the acid water.

It has been discovered that the contact of the acid water with the basic zeolites left by incomplete acid regeneration results in the described selective action; the strong mineral acids acting preferentially upon the basic zeolites, forming dissolved salts of these acids, sulfates, chlorides, etc., and leaving the carbonic acid mostly free. Thus the effluent water is a water softened by removal of the bases combined as carbonates and bicarbonates in the hard water, the carbonic acid so combined being set free and transformed into a solution of carbon dioxide. It will be seen that this two-fold action, first, of converting the salts into their acids and then converting the free mineral acids back into their salts and allowing most of the carbonic acid to pass unchanged through the unregenerated zone of the bed, causes the zone of hydrogen zeolite to move forward through the zeolite bed in the direction of flow of the water and at the same time to contract in length because of the transformation of the hydrogen zeolite into basic zeolite with conversion of the salts present in the water first into acid with some part of the acids converted back again into salts.

The extent to which the hydrogen zeolite is regenerated by acid treatment after its exhaustion can be adjusted to the composition of the water to be softened. In the ideally efficient process, the extent of regeneration should be such that the zone of hydrogen zeolite during the water treatment reaches the end of the zeolite bed and disappears at the same moment that the entire bed becomes a homogeneous exhausted zeolite charged with the bases contained in the water passing through the bed. If the hydrogen zeolite zone reaches the end of the zeolite bed before the hydrogen zeolite is exhausted, the effluent water is acid. The extent of regeneration of the bed to hydrogen zeolite is, according to the invention, adjusted so that this does not happen. If, on the other hand, the zone of hydrogen zeolite disappears much before it reaches the end of the zeolite bed, the process is not worked at its maximum efficiency. In practice, of course, these zone transformations are not sharp because the boundaries between the different zones are not sharp. However, in operation of the process, the extent of regeneration of the bed by acid is so adjusted that not more than a minimum proportion, if any, of the water passing through the bed following regeneration contains a substantial amount of acid. The quantity of acid used in the regeneration flow and the length of the run following regeneration, that is the quantity of water treated, can be so correlated that the effluent water during the entire softening run has a slightly alkaline reaction due to the presence of dissolved carbonates in the water. The conversion of the base in the unregenerated basic zone of the bed into dissolved salts by the acid water coming from the regenerated zone includes sufficient carbonate formation to give the effluent water a methyl orange alkalinity. It has been found that this action is facilitated by having present in the water a small amount of a sodium salt, advantageously sodium carbonate.

While I have stated the process as applied to downflow softeners using a pervious bed, it can also be used in up-flow softeners having a loose body of zeolite granules, mostly in motion. The same results are obtained where a given zeolite granule is only partly regenerated as if distinct zones were formed in a pervious bed by downflow.

As stated above, an optimum quantity of the acid used in the regeneration of a given zeolite varies with the nature of the water under treatment. The standard or normal amount of acid to be used is the theoretical quantity required to react with the alkalinity (methyl orange alkalinity) of the charge of water which is passed through the bed after regeneration. If a little more alkalinity is desired in the effluent a little less acid is employed. On the other hand it is found in practice that even if a slight excess of acid is used beyond this theoretical amount, there is still some methyl orange alkalinity in the effluent.

It is found that presence of sodium ions in the hard water, in addition to the calcium and magnesium ions, results in a concentration of the sodium ions in the effluent and of the bed, the calcium and magnesium ions being for the most part at the influent end of the basic zone of the bed. As stated above, the result of this is a tendency for basic ions present in the water to be exchanged for sodium ions immediately before the water leaves the bed of zeolite.

In other words, in the new process there is not only a selective action between anions or acid constituents but there appear also to be selective actions as regards the basic constituents and this latter selective action may be utilized in various ways.

According to the invention, the regeneration of the exhausted zeolite leaves a zone of hydrogen zeolite at the entering end of the bed merging into a zone of basic zeolite at the exit end of the bed. This division of the bed into different zones occurs either in a downflow softener with the usual backwash following the softening flow when the bed is substantially completely exhausted or in an upflow softener where backwashing may be unnecessary. In the water flow following regeneration the effluent water is nearly but not completely soft. The result of obtaining a non-acid water by softening with a hydrogen zeolite of high capacity compensates for a slightly reduced softening capacity between regenerations. The regeneration flow is in the same direction as the softening flow so that the hard water entering the zeolite bed after regeneration passes first through the hydrogen zeolite zone and then through the basic zone.

The acid used for regeneration in dilute solution may be any suitable acid such as hydrochloric, sulfuric, acetic, etc. An advantageous result of the process is a low consumption of acid per unit of hardness removed from the water. The consumption of acid is usually from 60 to 80 per cent of the acid consumption for full regeneration of the zeolite to hydrogen zeolite giving a fully softened effluent with an acidity substantially equivalent to the chlorides and sulfates in the raw water.

In cases where a completely softened water is desired, for boiler feed as an example, it is usually advantageous to operate the incomplete regeneration process in conjunction with and followed by ordinary base exchange apparatus, with common salt regeneration, in series with the hydrogen exchange softener regenerated by acid. The water is first passed through the incompletely regenerated hydrogen zeolite bed as described; carbonate and bicarbonate being removed by aeration or boiling of the effluent, and sulfates and chlorides, etc., being left. The water is passed through a base exchange softener. The effluent water is thereby completely softened and contains only the sodium salts of the strong acids. This has particular advantages in boiler water treatment.

Among the advantages of this series system are that the economy of the acid regeneration is improved, and a non-acid rinse effluent is secured. Furthermore the effluent from the hydrogen zeolites is already on the alkaline side, and should it contain any acidity this is neutralized by the sodium zeolite unit. Both units can be operated at maximum efficiency in the chemical process of softening which consists in effect of treating hard water with acid in one case and with common salt in the other.

The incomplete acid regeneration may be carried out with an acid sodium salt and the effluent softened water then contains methyl orange alkalinity and no hardness. This requires only a single unit of apparatus for softening and a lower initial cost. The operating cost, however, is somewhat higher in acid and salt consumption than with two softening units in series.

When the hardness in the water is mainly temporary or carbonate hardness, the incomplete regeneration with acid as described gives a nearly soft water of basic reaction charged with $CO_2$. No further softening may be required.

In a specific embodiment of the incomplete regeneration process, a bed of sulfated humic zeolite of 2 cubic feet in volume was regenerated with two pounds of concentrated sulfuric acid diluted to two per cent strength. This dilute acid was passed through the bed in about 20 minutes and it was then rinsed with 60 gallons of water. At the end of the rinsing the effluent water had a methyl orange alkalinity of 10 parts per million expressed as $CaCO_3$. The regeneration and rinsing required about 40 minutes time. Then 2130 gallons of water, having a total hardness of 123 parts per million calcium carbonate equivalent, a carbonate alkalinity of 115 parts per million and 7 parts free $CO_2$ per million, were passed through the softener in a little less than 10 hours. During the softening run, the hardness of the effluent ranged from 20 to 40 parts per million shown by the usual soap test; the methyl orange alkalinity from 10 to 30 parts per million expressed as $CaCO_3$; and the free $CO_2$ varied between 72 and 56 parts per million. These results compare with a substantially complete softening of 2616 gallons of the same hard water with regeneration of the bed by 4 pounds of concentrated sulfuric acid in a concentration of 2 per cent, followed by rinsing with 76 gallons of water. The softening run with complete acid regeneration gave an effluent water having an acidity around 14 parts per million $CaCO_3$ equivalent and a free $CO_2$ content around 90 parts per million.

In the accompanying drawing are curves or graphs showing comparative results in efficiency of operation associated with different quantities of acid passed through the same zeolite bed for regeneration of the hydrogen ion exchange power preparatory to softening flows of the same hard water.

In the showing, the graphs are numbered 1, 2, 3 to correspond with the number of pounds of 66° Baumé sulfuric acid used in regeneration per cubic foot of the hydrogen zeolite bed. The zeolite is a sulfated coal. The ordinates of the graphs are the hardness and acidity of the effluent water and the abscissae are the cumulative amounts of hardness taken from the water by the bed and expressed as thousands of grains $CaCO_3$ per cubic foot of zeolite in the bed. The solid line curves H1, H2, H3 show the degree of hardness in the effluent water and the FMA curves 1, 2, 3, in dotted lines show the free mineral acid of the effluents as measured by methyl orange titration—both expressed as parts of $CaCO_3$ equivalent per million of the effluent water. The nomenclature used is as follows: H is total hardness expressed in parts per million (p. p. m.) $CaCO_3$ equivalent. Alkalinity A is alkalinity expressed in p. p. m. $CaCO_3$ equivalent measured by acid titration with methyl orange indicator and giving a rough measure of bicarbonates in the water. FMA is free mineral acidity in the effluent water expressed as equivalent of $CaCO_3$ in p. p. m. and usually measured by alkali titration with methyl orange indicator. ThMA is the mineral acidity theoretically equivalent to the chlorides and sulfates in the raw water and expressed as the equivalent of $CaCO_3$ in p. p. m. HExV is the value of hydrogen actually given up by the hydrogen zeolite expressed in terms of kilograins (Kgrs.) $CaCO_3$ per cubic foot of the zeolite bed. CaMgInV is the hardness taken up by the zeolite expressed as Kgrs. $CaCO_3$ per cubic foot of zeolite.

The values plotted in the graphs were obtained by analysis of the effluent water from a hydrogen zeolite softener containing 2 cubic feet of the zeolite. The raw water analysis is:

| | Parts per million |
|---|---|
| Total hardness ($CaCO_3$ equivalent) | 123 |
| Alkalinity A | 116 |
| Chlorides as Cl | 7 |
| Sulfates as $SO_3$ | 13 |
| Sodium salts | 20 |
| ThMA | 27 |

It is noted that the curves show the following comparative results in acid consumption per kilograin of hardness removed from raw water by the zeolite:

Curve H3 indicates that the bed when regenerated with 3 pounds 66° Bé. sulfuric acid per cubic foot of zeolite can take up about 11 kgr. hardness per cubic foot of the bed as CaMgInV. This is a consumption of 0.25 pound $H_2SO_4$ per 1000 grains of hardness removed from the water, an excess of 80 per cent over the theoretical acid requirement. Curve H2 indicates that the same zeolite bed regenerated with 2 pounds 66° Bé. acid per cubic foot will take up over 10 kgrs. hardness with a consumption of 0.18 pound $H_2SO_4$ per kilograin of HEXV or CaMgInV. This is 30 per cent over theory and a 25 per cent decrease in acid consumption. The curves show also that there is but a small difference between the two operations in the amount of hardness left in the effluent water.

The two FMA curves 2 and 3 show that there is also a small difference between the two operations in the free mineral acidity of the softened water. The acidity, however, begins to come down before the hardness goes up. The drop in acidity near the end of the run is of course a reflection of the increase in basicity of the zeolite bed.

Curves FMA1 and H1 illustrate fully the effect of incomplete regeneration in decreasing the acidity and increasing the residual hardness of the softened water. The zone of basic zeolite is of sufficient extent to remove from the water all the free mineral acid formed in the zone of hydrogen zeolite and to impart a substantial carbonate basicity or methyl orange alkalinity. With HExV of 5.8 kgrs. per cubic foot of zeolite the acid consumption is 0.16 pound $H_2SO_4$ per kilogram of hardness removed from the water and taken up by the bed. This is only 14 per cent over theory.

What is claimed is:

1. In the production of softened water from hard water by the aid of hydrogen zeolites capable of removing the bases of permanent hardness and with acid regeneration, the method of controlling the acidity of the softened water which comprises passing in alternation through a pervious bed of said hydrogen ion zeolites a flow of hard water to be incompletely softened and a regenerating flow of water containing merely enough acid to convert a substantial part but not all of the zeolite into hydrogen zeolite.

2. In the softening of water containing both carbonate and sulfate hardness by carbonaceous hydrogen ion zeolites in a pervious bed removing the bases of said hardness, the process of controlling acidity in the effluent softened water which comprises feeding an acid liquid to the inflow face of the bed, the amount of acid so fed being sufficient to regenerate the greater part but not all of the zeolites in the bed, rinsing and thereafter passing said hard water into and through the bed in the same direction, thereby removing all bases in a flow of water next the inflow face with liberation of sulfuric acid and neutralization of this acid by bases left in the zeolite next the outflow face.

3. In a process of softening water by a hydrogen zeolite abstracting bases of permanent hardness with acid regeneration of the zeolite, the improvement which comprises regenerating the zeolite when required with a quantity of acid less than that required to fully restore the hydrogen zeolite and running the water over the incompletely regenerated hydrogen zeolite to produce a softened water having a basic reaction.

4. In the process of claim 3, aerating the softened water to remove $CO_2$.

5. In the process of claim 3, removing $CO_2$ from the basic water and passing the water over a sodium zeolite.

6. In the purification of water, a process which comprises removing basic cations from the water by alternately passing the water through a bed of hydrogen zeolite delivering an effluent containing methyl orange alkalinity and incompletely regenerating the zeolite with an acid solution insufficient in amount to fully restore the hydrogen zeolite, thereby leaving the zeolite partially charged with basic cations.

7. In the process of claim 6, establishing by the incomplete regeneration a zone of basic zeolite near the exit end of the bed.

8. In the process of claim 6, incompletely regenerating with about half the quantity of acid required for full regeneration of the bed to hydrogen zeolite.

9. In the process of claim 6, regenerating the bed with an acid salt solution.

10. A process of treating alkaline water containing salts of strong mineral acids, which comprises passing a charge of the water through a body of incompletely regenerated hydrogen zeolite of humic nature and capable of removing bases of said salts and from time to time incompletely regenerating the zeolite with acid, in amount approximately that required to react with the total amount of alkalinity in the charge of water.

11. The process of claim 10 wherein the water treated contains a hardness-imparting base.

12. The process of claim 10 wherein the water treated contains soda.

13. A process of treating water containing sodium bicarbonate for lessening the sodium bicarbonate content, which comprises passing the water through a body of an incompletely regenerated hydrogen zeolite to abstract some of the sodium and to secure an effluent containing methyl orange alkalinity, and removing $CO_2$ from the effluent.

RAY RILEY.

CERTIFICATE OF CORRECTION.

Patent No. 2,127,310. August 16, 1938.

RAY RILEY.

It is hereby certified that error appears in the printed specification of the above numbered patent requiring correction as follows: Page 4, second column, line 57, claim 11, for the word "hardness-imparted" read hardness-imparting; and that the said Letters Patent should be read with this correction therein that the same may conform to the record of the case in the Patent Office.

Signed and sealed this 13th day of September, A. D. 1938.

Henry Van Arsdale (Seal)

Acting Commissioner of Patents.